United States Patent
Sarosi (10) Patent No.: US 9,178,945 B2
(45) Date of Patent: *Nov. 3, 2015

(54) SYSTEM AND METHOD FOR REMOTELY ACCESSING CABLECARD MODULE

(71) Applicant: TIME WARNER CABLE INC., New York, NY (US)

(72) Inventor: George Sarosi, Niwot, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,179

(22) Filed: Nov. 2, 2012

(65) Prior Publication Data

US 2013/0073694 A1 Mar. 21, 2013

Related U.S. Application Data

(63) Continuation of application No. 11/930,532, filed on Oct. 31, 2007, now Pat. No. 8,316,150.

(51) Int. Cl.
| | |
|---|---|
| *H04N 21/658* | (2011.01) |
| *H04N 7/16* | (2011.01) |
| *H04N 7/173* | (2011.01) |
| *H04L 29/08* | (2006.01) |
| *H04N 21/418* | (2011.01) |
| *H04N 21/442* | (2011.01) |
| *H04N 21/643* | (2011.01) |
| *H04N 21/258* | (2011.01) |
| *H04L 12/24* | (2006.01) |
| *H04L 29/06* | (2006.01) |

(52) U.S. Cl.
CPC ............. *H04L 67/125* (2013.01); *H04N 7/162* (2013.01); *H04N 7/17318* (2013.01); *H04N 21/25833* (2013.01); *H04N 21/4181* (2013.01); *H04N 21/4424* (2013.01); *H04N 21/64322* (2013.01); *H04N 21/6582* (2013.01); *H04L 41/0213* (2013.01); *H04L 63/102* (2013.01)

(58) Field of Classification Search
USPC .......................................................... 709/238
See application file for complete search history.

(56) References Cited

U.S. PATENT DOCUMENTS

| | | | |
|---|---|---|---|
| 6,944,650 | B1 | 9/2005 | Urien |
| 7,065,780 | B2 | 6/2006 | Barbier et al. |
| 2001/0032273 | A1 | 10/2001 | Cheng |
| 2001/0039583 | A1 | 11/2001 | Nobakht et al. |

(Continued)

OTHER PUBLICATIONS

Robert McNabb et al. "HOST-MIB Tune-Up", CableLabs, Apr. 30, 2007, EC Identifier: HOST2.0-CFR-R-07.1038-1, pp. 1-54.

(Continued)

*Primary Examiner* — Jenee Williams
(74) *Attorney, Agent, or Firm* — Volentine & Whitt, PLLC (57) ABSTRACT

A system for remotely accessing diagnostic information from an access control module includes a host device. The host device is configured to interface with the access control module over a direct connection to retrieve diagnostic information from the access control module in response to a host query from the host device, and to interface with a network server over an Internet protocol (IP) network to provide the diagnostic information relating to the access control module to the network server in response to a server query to an IP network address of the host device. The access control module is non-addressable in the IP network.

20 Claims, 4 Drawing Sheets

(56) References Cited

U.S. PATENT DOCUMENTS

| | | |
|---|---|---|
| 2002/0034179 A1 | 3/2002 | Ollikainen et al. |
| 2002/0059638 A1 | 5/2002 | Oz et al. |
| 2002/0196786 A1* | 12/2002 | Laumen et al. ............... 370/338 |
| 2003/0048380 A1 | 3/2003 | Tamura |
| 2004/0042604 A1* | 3/2004 | Hiltunen et al. .............. 455/558 |
| 2004/0147285 A1* | 7/2004 | Urien ............................ 455/558 |
| 2004/0158721 A1 | 8/2004 | Candelore |
| 2004/0228175 A1 | 11/2004 | Candelore et al. |
| 2005/0050576 A1 | 3/2005 | Upendran et al. |
| 2005/0076363 A1 | 4/2005 | Dukes et al. |
| 2005/0183130 A1* | 8/2005 | Sadja et al. .................. 725/107 |
| 2006/0047957 A1 | 3/2006 | Helms et al. |
| 2006/0053446 A1* | 3/2006 | Kim et al. ....................... 725/39 |
| 2006/0130114 A1 | 6/2006 | Kwon et al. |
| 2007/0180532 A1* | 8/2007 | Cha et al. ........................ 726/25 |
| 2007/0239857 A1 | 10/2007 | Mahalal et al. |
| 2008/0092187 A1 | 4/2008 | Noiri et al. |
| 2008/0196079 A1 | 8/2008 | Lee et al. |

OTHER PUBLICATIONS

"CableCARD™ Interface 2.0 Specification-OC-SP-CCIF2.0-I10-070323", CableLabs, Mar. 23, 2007, pp. 1-317.

"OpenCable Host Device 2.0 Core Functional Requirements-OC-SP-HOST2.0-CFR-I13-070323", CableLabs, Mar. 23, 2007, pp. 1-140.

Cablelabs, OpenCable Specifications: OpenCable Host Device 2.X MIB Specification OC-SP-MIB-HOST2.X-I02-070921, Sep. 21, 2007, I02, pp. 42-43.

* cited by examiner

SYSTEM AND METHOD FOR REMOTELY ACCESSING CABLECARD MODULE

CROSS-REFERENCE TO RELATED APPLICATIONS

This application is a continuation application of application Ser. No. 11/930,532, filed on Oct. 31, 2007, which is hereby incorporated by reference for all purposes.

BACKGROUND

As demand for digital entertainment increases, multimedia content providers, such as television broadcasters, increasingly face the problem of identifying and addressing faulty systems. Customer equipment, in particular, presents a challenge in that host devices, which receive and demodulate programming signals and provide interface functionality, are located at the customer's premises. The host devices typically interface with access control modules, which limit access to programming content by enabling encryption/decryption of signals, user authentication and the like. The access control modules may be implemented, for example, using a separate cablecard or a built-in module providing essentially the same functionality as a cablecard. Sending technicians to customer locations for diagnosing and repairing problems which may occur in the host devices and/or the access control modules is time consuming, expensive and otherwise inefficient.

Presently, various problems occurring at a host device may be remotely diagnosed, for example, at a cable headend computer, over a Transmission Control Protocol (TCP)/Internet Protocol (IP) network. This is accomplished, in part, using an IP address of the host device to identify and contact the host device in order to retrieve associated data. However, such remote contact is not possible for systems that are not separately addressable on the network.

For example, the United States has adopted the OPENCABLE™ standard by Cable Television Laboratories, Inc. The OPENCABLE™ host middleware includes the OPENCABLE™ Application Platform (OCAP) standard, which supports bi-directional communications between the host at the customer premises and the headend computer. Accordingly, diagnostic information relating to a number of predetermined parameters may be provided through the TCP/IP network using the IP address of the host.

However, the OPENCABLE™ standard includes CABLECARD™ specifications for access control modules, which provide content copy protection and customer authentication. The access control modules are not directly IP addressable. Also, although CABLECARD™ supports providing data from an access control module, such as HyperText Markup Language (HTML) pages, the data may be shown only on the host display (e.g., the customer's television set or monitor). Accordingly, to the extent the HTML formatted data provides diagnostic information, a technician must be physically present at the customer site to view the information in order to detect and address any problems with the access control module.

SUMMARY

In a representative embodiment, a system for remotely accessing data from a non-addressable access control module over a communications network, includes a host device, which is configured to interface with a network server remotely located from the host device and the access control module. The network server may be included in a cable headend. The host device includes a table populated by information provided by the access control module in response to a query from the host device. The host device provides at least a portion of the table to the server through the communications network in response to a server query to a network address of the host device. The table may be included in a management information base (MIB) of the host device.

The communications network may include an Internet Protocol (IP) network, and the network address of the host device may be an IP address. The access control module may be a non-IP addressable device. Further, the access control module may include a separate card, with which the host device interfaces through a Personal Computer Memory Card International Association (PCMCIA) interface. The separate card may be configured as a CABLECARD™ according to the OPENCABLE™ standard.

The host device may send the query to a Uniform Resource Locator (URL) associated with the information provided by the access control module, the URL being previously provided to the host device in an application information resource. The information provided by the access control module may be HyperText Markup Language (HTML) formatted.

In another representative embodiment, a system for remotely accessing information of a cablecard module configured to control access to programming content includes a cable headend computer. The cable headend computer is configured to receive an MIB from a host device, corresponding to the cablecard module, over an IP network, in response to a first query from the headend computer to the host device. The MIB includes diagnostic information provided by the cablecard module in response to a second query from the host device to the cablecard module.

The host device may be an IP addressable device and the cablecard module may be a non-IP addressable device. The information provided by the cablecard module may be HTML formatted. The cablecard module may be a CABLECARD™ in accordance with the OPENCABLE™ standard. Also, the MIB may be Simple Network Management Protocol (SNMP) formatted.

The headend computer may also parse the diagnostic information provided by the cablecard module for analysis. Also, the system may further include a display which displays at least a portion of the parsed information, and a database which stores at least a portion of the parsed information.

In another representative embodiment, a method for remotely accessing information on a cablecard module, configured to provide access control of programming content, includes querying a host device, associated with the cablecard module, over an IP network, and receiving data from an MIB of the host device over the IP network in response to the query. The MIB data includes information provided by the cablecard module in response to a host query from the host device to the cablecard module. The received cablecard information is parsed for at least one of displaying and storing at least a portion of the cablecard information.

The host device may have an IP address and the cablecard module may have no IP address, and the MIB may be SNMP formatted. The cablecard information may be included in an ocStbHostCCAppInfoEntry of an ocStbHostCCAppInfoTable of the SNMP MIB.

BRIEF DESCRIPTION OF THE DRAWINGS

The present teachings are best understood from the following detailed description when read with the accompanying

DETAILED DESCRIPTION

In the following detailed description, for purposes of explanation and not limitation, representative embodiments disclosing specific details are set forth in order to provide a thorough understanding of the present teachings. Descriptions of well-known devices, hardware, software, firmware, methods and systems may be omitted so as to avoid obscuring the description of the example embodiments. Nonetheless, such hardware, software, firmware, devices, methods and systems that are within the purview of one of ordinary skill in the art may be used in accordance with the representative embodiments.

Figure 1:
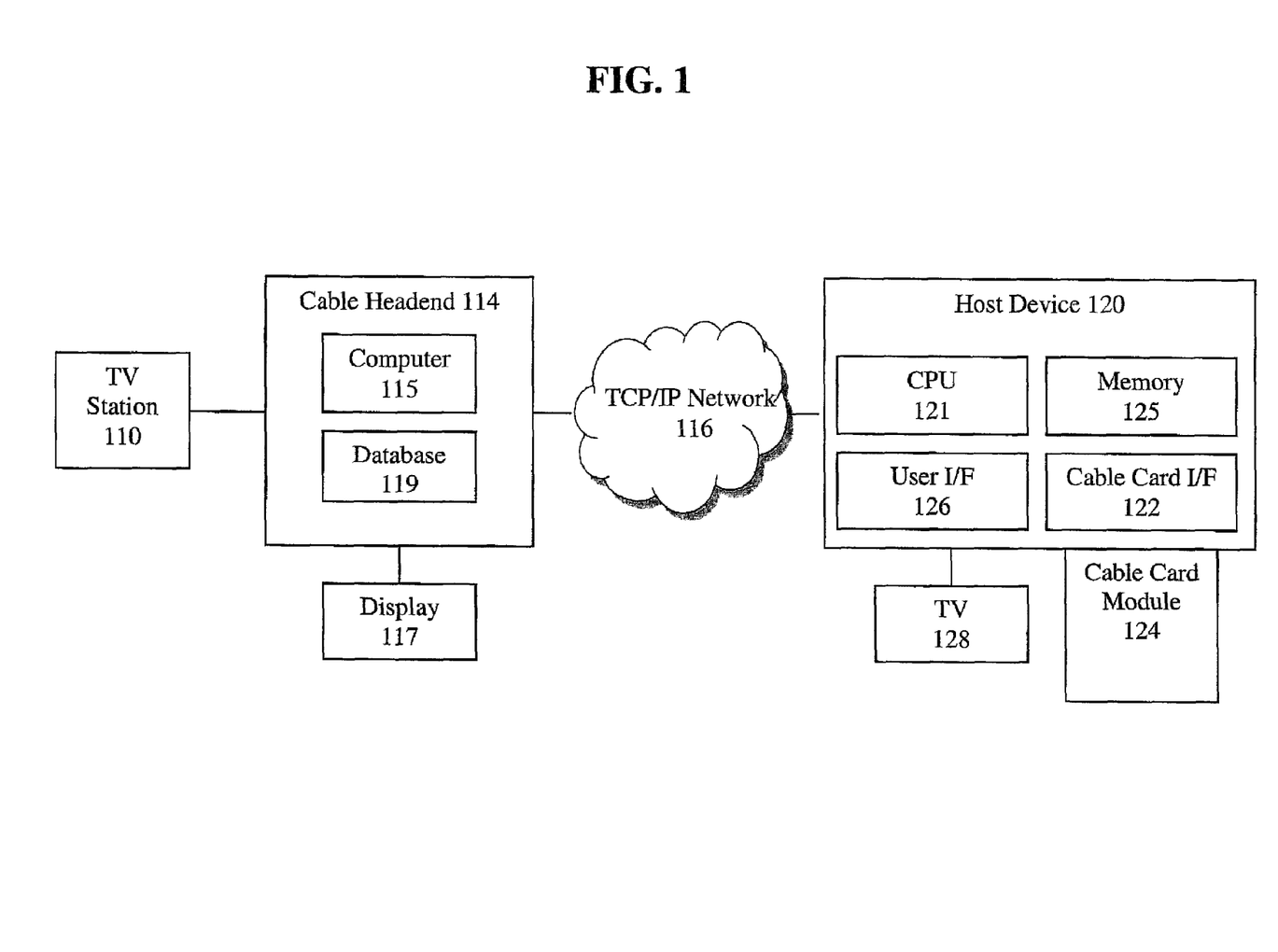
FIG. 1 is a block diagram illustrating a system for remotely accessing cablecard information, according to a representative embodiment of the present invention.

FIG. 1 is a block diagram illustrating a system for remotely accessing data, including diagnostic information, according to a representative embodiment of the present invention. A cable headend 114, e.g., including a regional network server, is configured to receive signals having multimedia content from various sources, indicated by a representative television station 110, over a network 112. The network 112 may be any communications network capable of communicating the content to the headend 114, including cable, fiber or satellite networks, for example. In an embodiment, the network 112 is an IP-based network for communicating digital data content.

The headend 114 may be situated to provide signaling downstream to multiple customers within a particular geographic region over a communications network, such as a TCP/IP network 116. In an embodiment, the network 116 is physically implemented over a hybrid fiber coaxial (HFC) network, although other data communication networks, such as cellular networks, satellite networks, coaxial cable networks and the like, may be implemented without departing from the spirit and scope of the present invention. The headend 114 includes a computer 115, which parses and processes information received from a host device 120. The parsed information may be displayed on a headend display 117 and/or stored in a headend database 119, for example.

Each customer has on-premises equipment for receiving the digital content, indicated in FIG. 1 by the host device 120, which corresponds to a representative customer. The host device 120 may be a digital multimedia receiver, such as a digital ready television, a set top box, a digital video disk (DVD) player, or the like. The region serviced by the headend 114 includes a number of customers, each of whom has a corresponding host, although the structure and operation of only one host (i.e., the host device 120) is described for purposes of simplifying the explanation. The host device 120 is addressable on the network 116 and thus has, for example, an associated IP address. Accordingly, the host device 120 is capable of bi-directional communications with the headend 114 over the network 116. In an embodiment, the host device 120 may be implemented in accordance with OPENCABLE™ Host Device 2.0 Core Functional Requirements, OC-SP-HOST2.0-CFR-I13-070323, and OPENCABLE™ Host Device 2.0 Core Functional Requirements, Engineering Change Request (ECR) 1038, HOST2.0-CFR-R-07.1038-1, the contents of each of which are incorporated herein by reference.

In the depicted embodiment, the host device 120 includes an interface 122 to a cablecard module 124, e.g., conforming to the CABLECARD™ standard, for providing a conditional access function for the OPENCABLE™ host device 120. For example, the cablecard module 124 may include decryption functionality for decrypting digital content received from the headend 114 and user authentication functionality to authenticate the customer, when necessary. The cablecard module 124 may be an internal module or a separate card. When the cablecard module 124 is a separate card, the interface 122 may be a standard Personal Computer Memory Card International Association (PCMCIA) interface, as identified in the OPENCABLE™ standard. The cablecard module 124 is not directly addressable remotely on the network 116. In an embodiment, the cablecard module 124 may be implemented in accordance with CABLECARD™ Interface 2.0 Specification, OC-SP-CCIF2.0-I10-070323, the contents of which is incorporated herein by reference.

The host device 120 is also shown as including a central processing unit (CPU) 121, a memory 125 and a user interface 126. With respect to the user interface 126, the received digital content may be displayed to the customer at a display 128 through the user interface 126. Also, configuration and performance information from the host 124 and/or the cablecard module 124, including diagnostic data, may be viewed at the display 128 through the user interface 126, as needed. Likewise, various commands and instructions, including channel and programming selection, authentication data and the like, may be sent and received by the host device 120, for example, through the user interface 126. Such commands and instructions may be processed by the CPU 121, which may also perform various programming and signal processing functions, such as digital tuning, for example.

In an illustrative embodiment, the host device 120 has a Simple Network Management Protocol (SNMP), and thus may include an SNMP Management Information Base (MIB) object populated by host device information, including diagnostic information, and stored in the memory 125. The stored MIB includes multiple tables of data values corresponding to various parameters of the host device 120, as well as parameters retrieved from the cable card module 124, as discussed below. Accordingly, a remote location, such as the headend 114, may access the stored MIB to retrieve the MIB data, including the diagnostic information. More particularly, the MIB enables the computer 115 of the headend 114 to obtain a predetermined list of parameters from the host device 120 through the network 116 in response to a query, which may includes, for example, an object identifier (OID) corresponding to MIB data or a group of MIB data. The computer 115 may therefore query for any specific MIB value. This enables obtaining diagnostic information, troubleshooting and debugging the host device 120 from the headend 114, without having to be physically present at the customer site.

An example of the MIB is defined by the OPENCABLE™ specification, e.g., OPENCABLE™ Host Device 2.0 Core Functional Requirements, OC-SP-HOST2.0-CFR-I13-070323, and OPENCABLE™ Host Device 2.0 Core Functional Requirements, identified above, which provides attributes of the host device 120, but not of the cablecard module 124, for example. Therefore, these values are not conventionally accessible through the MIB of the host device 120. Further, the cablecard module 124 does not have its own MIB because it not directly IP addressable, as discussed above. The cablecard module 124 does, however, have a man machine interface (MMI), which enables various values to be displayed on the customer display 128, for example, through HTML formatted pages. Therefore, according to an embodiment of the present invention, the HTML data is placed into an additional table of the MIB on the host device 120, which can be queried, e.g., by the headend 114, for remote access to the cablecard module 124 information.

The CABLECARD™ Interface (CCIF) 2.0 Specification, OC-SP-CCIF2.0-I10-070323, discussed above, requires the cablecard module 124 to support an application information resource, which enables the host device 120 to query the cablecard module 124 for information on the current state of the cablecard module 124. For example, the application information resource may define the following information types:

| | |
|---|---|
| 0x00 | Conditional access; |
| 0x01 | CABLECARD ™ binding information application; |
| 0x02 | IP Service; |
| 0x03 | Network interface [Society of Cable Telecommunications Engineers (SCTE) Standard 55-2]; |
| 0x04 | Network interface [SCTE Standard 55-1]; |
| 0x05 | Copy protection application; |
| 0x06 | Diagnostic; |
| 0x07 | Undesignated; and |
| 0x08 | Network interface [Data Over Cable Service Interface Specifications (DCSIS) Set-top Gateway (DSG)]. |

The information is provided to the host device 120 under the control of the CPU 121 by the cablecard module 124 in the form of HTML pages, which contain labels and values for specific parameters on the cablecard module 124. Each HTML page is limited to a maximum of 16 lines of 32 characters. Therefore, when the information is longer than 16 lines, the message on the HTML page may include up to 16 lines of text, plus a hyperlink pointing to an additional HTML page. The host device 120 can then display the HTML pages, e.g., at the display 128 via the user interface 126, which may be used for trouble shooting.

In addition, in accordance with an embodiment of the present invention, the host device 120 populates a table with data from the HTML pages, e.g., which are from the MMI applications of the cablecard module 124. The table containing the information related to the cablecard module 124 is included in the SNMP MIB, which is remotely accessible by the headend 114. See, e.g., OPENCABLE™ Host Device 2.0 Core Functional Requirements, Engineering Change Request (ECR) 1038, HOST2.0-CFR-R-07.1038-1. The data from the HTML pages and/or the MIB may be stored, for example, in the memory 125.

Figure 2:
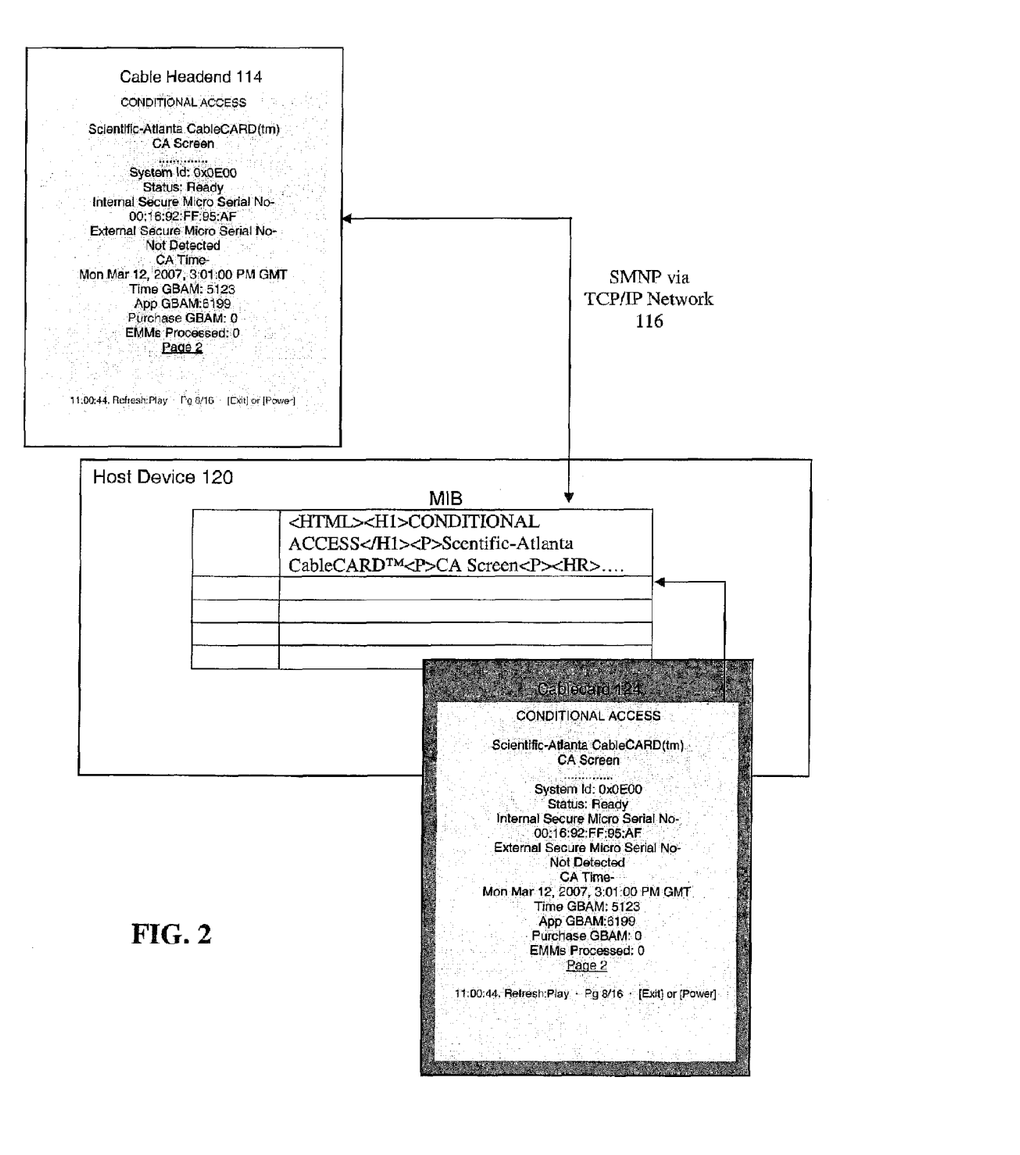
FIG. 2 is a diagram illustrating a representative data table, according to a representative embodiment of the present invention.

FIG. 2 is a diagram illustrating a representative data table of the cablecard module 124, according to a representative embodiment of the present invention. The representative cablecard module 124 shows illustrative application information resource data, which is sent to the host device 120 in response to a query and used to populate a table in the MIB of the host device 120. As discussed above, the cable headend 114 is able to remotely access the HTML data in SNMP from the MIB table of the host device 120 via the TCP/IP network 116, for example. The cable headend is then able to effectively retrieve the same application information resource data provided by the cablecard module 124 to the headend 114, even though the cablecard module 124 does not have an IP address on the network 116.

Figure 3:
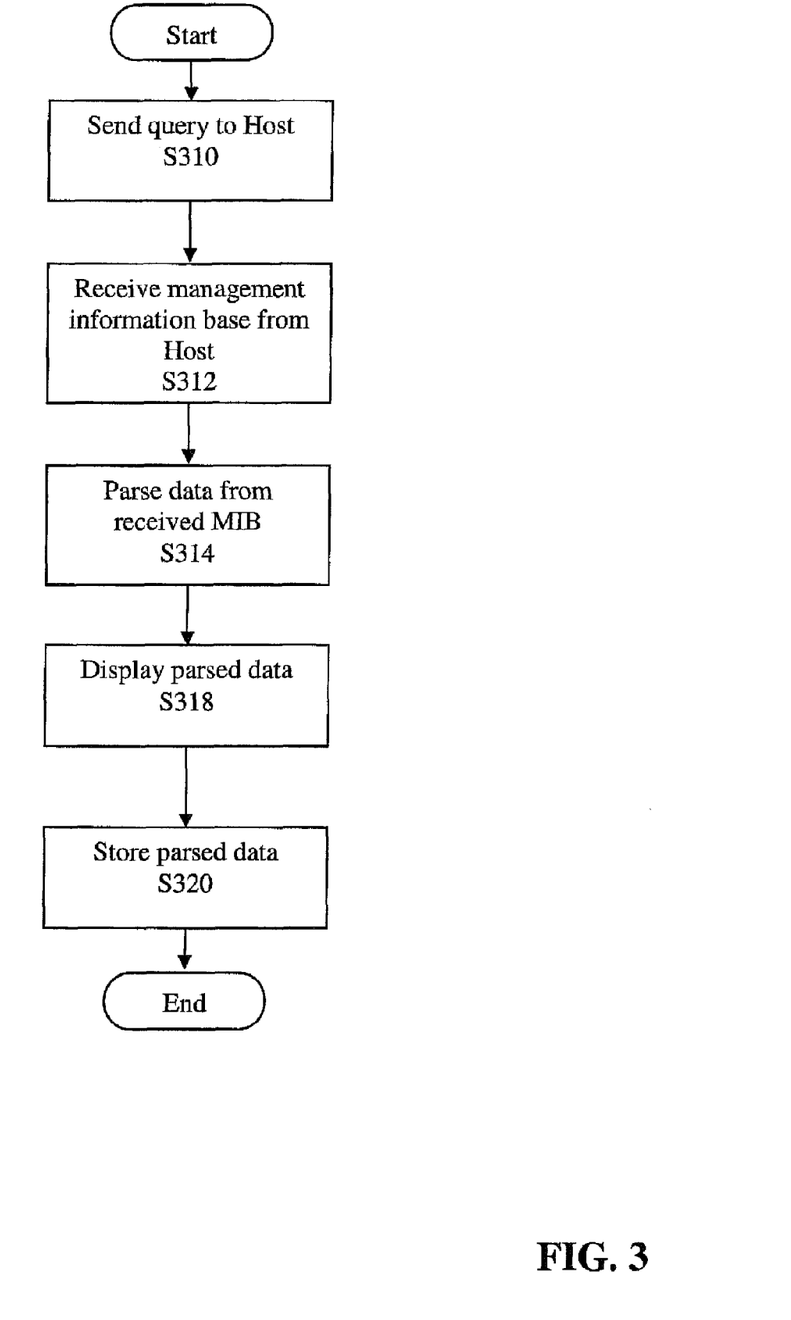
FIG. 3 is a flowchart illustrating a method for remotely accessing cablecard information, according to a representative embodiment of the present invention.
Figure 4:
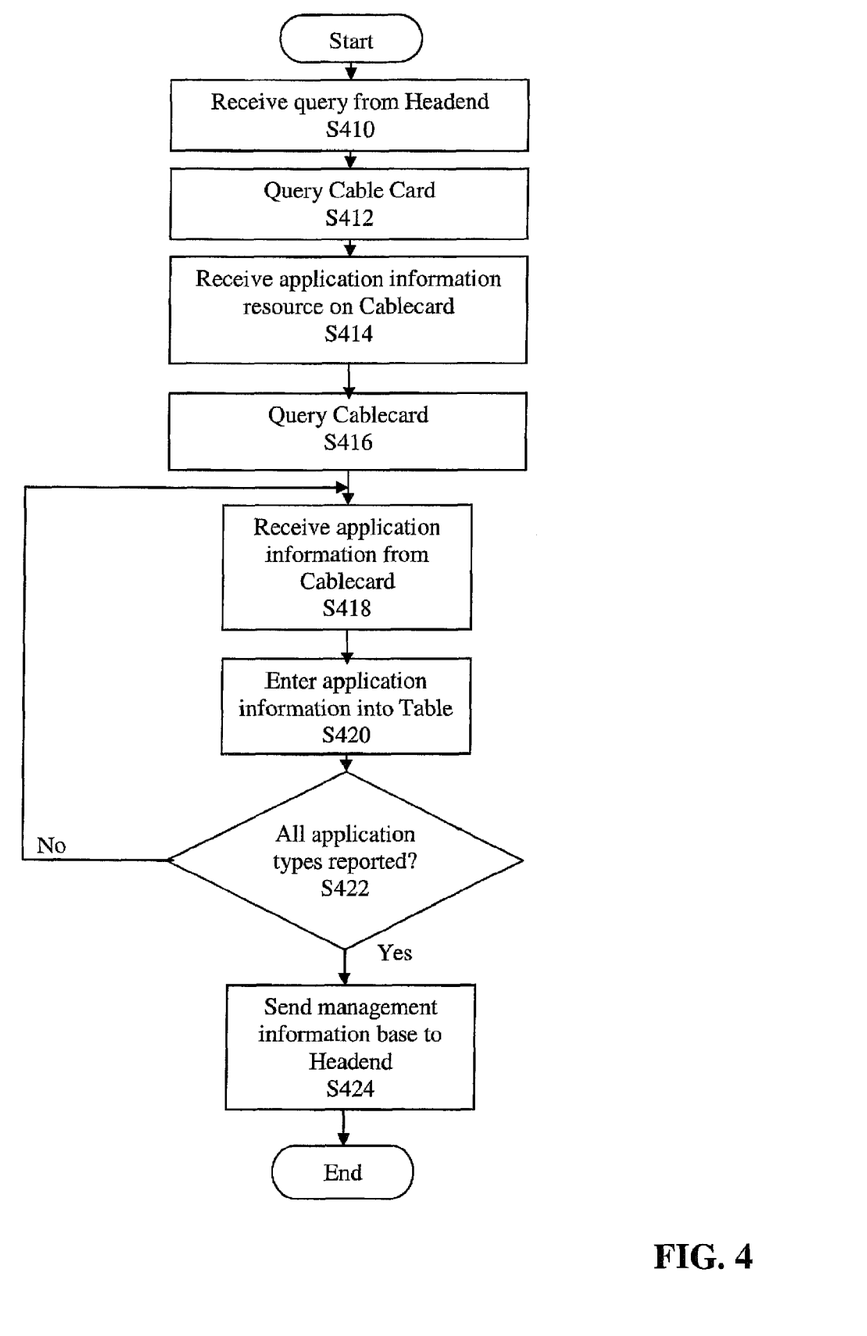
FIG. 4 is a flowchart illustrating a method for remotely accessing cablecard information, according to a representative embodiment of the present invention.

FIG. 3 is a flowchart illustrating a method of the cable headend 114 receiving cablecard information from a remote location, according to a representative embodiment of the present invention. FIG. 4 is a flowchart illustrating a method of the host device 120 obtaining the information from the cablecard and providing the cablecard information to the remote location, according to a representative embodiment of the present invention.

Beginning at step S310 of FIG. 3, the headend 114 (e.g., via the computer 115) sends a query to the host device 120 through the network 116, requesting information regarding the host device 120, including the cablecard module 124. The query is directed to the IP address of the host device 120, and may request specific SNMP MIB parameters of the host device 120 to retrieve diagnostic information relating to the cablecard module 124.

Referring to FIG. 4, the host device 120 receives the query from the headend 114 at step S410. At step S412, the host device 120 (e.g., via the CPU 121) queries the cablecard module 124 to retrieve the application information resource of the cablecard module 124. The cablecard module 124 may provide the application information to the host device 120 in an application_info_cnf( ) Application Programming Data Unit (APDU), for example. The host device 120 receives and opens the application information resource at step S414. Alternatively, the host device 120 may use cablecard information obtained from an earlier application information resource query, although the data would not be as current.

The host device 120 queries the cablecard module 124 at step S416 for specific data, for example, using the uniform resource locator (URL) relating to the data supplied by the cablecard module 124 in the application_info_cnf( ) APDU. The host device 120 may send a server_query APDU to the cablecard module 124 to request the information. In response to the query, the cablecard module 124 sends the requested information in an HTML format, which the host device 120 receives in step S418. The HTML formatted information may be included in a server_reply APDU. The host device 120 places data from the HTML formatted information into a table at step S420. For example, the host device 120 may place the HTML data bytes into an ocStbHostCCAppInfoEntry of an ocStbHostCCAppInfoTable in the SNMP MIB of the host device 120.

At step S422, the host device 120 determines whether all of the application types associated with the requested cablecard module information have been reported. For example, the various types of applications will be initially identified to the host device 120 in the application_info_cnf( ) ADPU received at step S414. When there are still unreported application types (step S422—YES), the process returns to step S418, where the host device 120 receives additional information of a different application type from the cablecard module 124, which information is then entered into the table at step S420.

When it is determined that there are no more unreported application types (step S422—NO), the host device 120 sends the management information, e.g., in the host device SNMP MIB, to the computer 115 of the headend 114 through the network 116 at step S424, which the headend 114 receives at step S312 of FIG. 3. An application running on the headend computer 115 parses the HTML data at step S314 and renders it to the headend display 117 at step S318. In an embodiment, the application may also store the parsed HTML data in the database 119 at step S320.

Accordingly, the IP addressable host device 120 is used as a proxy for retrieving information, including diagnostic data, from a non-IP addressable cablecard module 124. Generally, the host device 120 creates an MIB table dedicated to the parameters of the cablecard module 124. The MIB table is populated using HTML formatted information retrieved from the cablecard module 124. The HTML formatted information may be the same information used for HTML pages displayable at the customer display 128. The MIB table is remotely accessible to the headend 114 over the network 116.

Although the present teachings have been described in detail with reference to particular embodiments, persons possessing ordinary skill in the art to which the present teachings pertain will appreciate that various modifications and enhancements may be made without departing from the spirit and scope of the claims that follow. Also, the various devices and methods described herein are included by way of example only and not in any limiting sense.

What is claimed:

1. A system for remotely accessing diagnostic information from an access control module, the system comprising:
    a host device to interface with a network server over an Internet protocol (IP) network,
    the host device configured to interface with the access control module over a direct connection to retrieve diagnostic information from the access control module, regarding a current state of the access control module, in response to a host query from the host device, and
    to provide the diagnostic information relating to the access control module to the network server in response to a server query to an IP network address of the host device, wherein the access control module is non-addressable in the IP network, and wherein the host device sends the host query to a Uniform Resource Locator (URL) associated with the diagnostic information provided by the access control module, the URL being previously provided to the host device.

2. The system of claim 1, wherein the host device comprises a table populated by the diagnostic information from the access control module, at least a portion of the table being provided to the network server.

3. The system of claim 2, wherein the table is included in a management information base (MIB) of the host device.

4. The system of claim 1, wherein the host device comprises an interface configured to enable the direct connection to the access control module, the interface providing conditional access to the access control module.

5. The system of claim 4, wherein the interface comprises a Personal Computer Memory Card International Association (PCMCIA) interface.

6. The system of claim 1, wherein the diagnostic information is HyperText Markup Language (HTML) formatted.

7. A host device comprising:
    an access control module interface configured to enable conditional access to an access control module connected to the host device;
    a network interface configured to enable communication with a cable headend computer via an Internet protocol (IP) network, the host device being addressable on the IP network and the access control module being non-addressable in the IP network;
    a central processing unit (CPU) configured to retrieve from the access control module diagnostic information regarding a current state of the access control module via the access control module interface, and to provide the diagnostic information to the cable headend computer via the network interface and to receive digital content from the cable headend computer via the network interface; and
    a user interface configured to display the received digital content via a display and to display the diagnostic information from the access control module via the display, wherein the user interface is further configured to receive channel selection and authentication data entered by a user.

8. A host device comprising:
    an access control module interface configured to enable conditional access to an access control module connected to the host device;
    a network interface configured to enable communication with a cable headend computer via an Internet protocol (IP) network, the host device being addressable on the IP network and the access control module being non-addressable in the IP network;
    a central processing unit (CPU) configured to retrieve from the access control module diagnostic information regarding a current state of the access control module via the access control module interface, and to provide the diagnostic information to the cable headend computer via the network interface and to receive digital content from the cable headend computer via the network interface; and
    a memory configured to store the diagnostic information retrieved from the access control module.

9. The host device of claim 8, further comprising:
    a user interface configured to display the received digital content via a display.

10. The host device of claim 9, wherein the user interface is further configured to display the diagnostic information from the access control module via the display.

11. The host device of claim 8, wherein the access control module interface comprises a Personal Computer Memory Card International Association (PCMCIA) interface.

12. The host device of claim 8, wherein the diagnostic information is provided to the host device by the access control module in the form of HyperText Markup Language (HTML) pages.

13. A host device comprising:
    an access control module interface configured to enable conditional access to an access control module connected to the host device;
    a network interface configured to enable communication with a cable headend computer via an Internet protocol (IP) network, the host device being addressable on the IP network and the access control module being non-addressable in the IP network;
    a central processing unit (CPU) configured to retrieve from the access control module diagnostic information regarding a current state of the access control module via the access control module interface, and to provide the diagnostic information to the cable headend computer via the network interface and to receive digital content from the cable headend computer via the network interface; and
    a Simple Network Management Protocol (SNMP) Management Information Base (MIB) object populated by host device information comprising a table containing the diagnostic information.

14. A host device comprising:
    an access control module interface configured to enable conditional access to an access control module connected to the host device;
    a network interface configured to enable communication with a cable headend computer via an Internet protocol (IP) network, the host device being addressable on the IP network and the access control module being non-addressable in the IP network; and a central processing unit (CPU) configured to retrieve from the access control module diagnostic information regarding a current state of the access control module via the access control module interface, and to provide the diagnostic information to the cable headend computer via the network interface and to receive digital content from the cable headend computer via the network interface, wherein the access control module comprises decryption functionality for decrypting the digital content received from the cable headend computer and user authentication functionality to authenticate a user.

15. A host device comprising:

an access control module interface configured to enable conditional access to an access control module connected to the host device;

a network interface configured to enable communication with a cable headend computer via an Internet protocol (IP) network, the host device being addressable on the IP network and the access control module being non-addressable in the IP network; and a central processing unit (CPU) configured to retrieve from the access control module diagnostic information regarding a current state of the access control module via the access control module interface, and to provide the diagnostic information to the cable headend computer via the network interface and to receive digital content from the cable headend computer via the network interface, wherein the CPU retrieves the diagnostic information from the access control module device in response to a query to a Uniform Resource Locator (URL) previously associated with the diagnostic information.

16. The host device of claim 15, wherein the diagnostic information is HyperText Markup Language (HTML) formatted.

17. The host device of claim 15, further comprising:

a user interface configured to display the received digital content via a display, and to display the diagnostic information from the access control module via the display.

18. The host device of claim 15, wherein the access control module interface comprises a Personal Computer Memory Card International Association (PCMCIA) interface.

19. A method for remotely accessing diagnostic information provided by an access control module connected to a host device, the host device having conditional access to the access control module, the method comprising:

querying the host device for the diagnostic information via an Internet Protocol (IP) network; and retrieving the diagnostic information via the network using the host device as a proxy, wherein the host device is IP-addressable and the access control module is non-IP addressable, wherein the diagnostic information comprises information on a current state of the access control module, and wherein retrieving the diagnostic information using the host device as a proxy comprises receiving a management information base (MIB) table created by the host device, and populated using the diagnostic information retrieved from the access control module.

20. The method of claim 19, wherein the diagnostic information is HyperText Markup Language (HTML) formatted.

\* \* \* \* \*